United States Patent Office

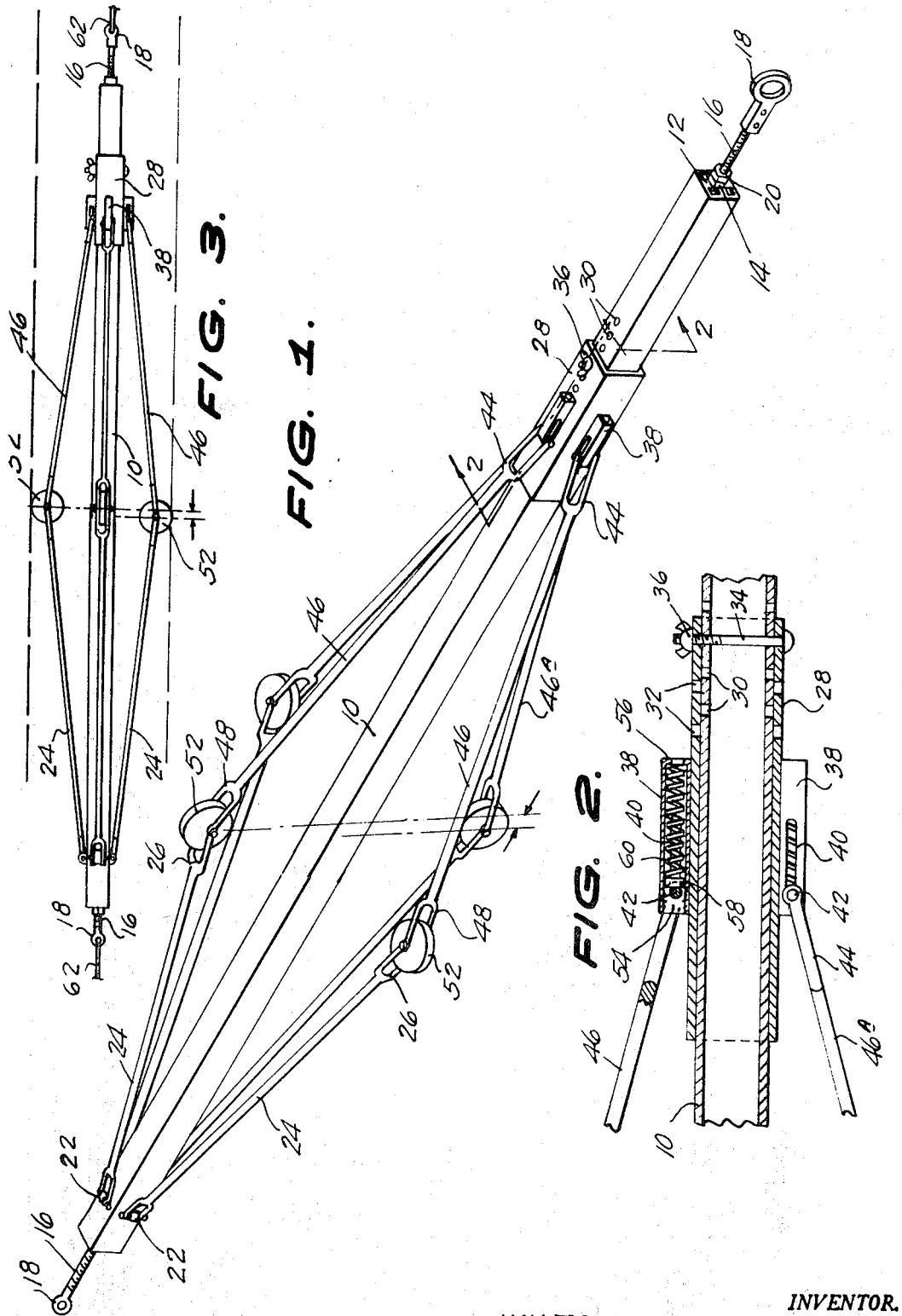

3,533,166
Patented Oct. 13, 1970

3,533,166
PIPE Y LOCATOR
Wilton J. Pino, Jr., Baton Rouge, La., assignor of one-tenth to A. J. Spedale, Baton Rouge, La.
Filed Sept. 17, 1968, Ser. No. 760,268
Int. Cl. G01b 3/02
U.S. Cl. 33—174       4 Claims

ABSTRACT OF THE DISCLOSURE

An instrument to locate branches in a concealed pipe, said instrument comprising: a central, elongated body having at each end means to connect said body to a cable or the like; a plurality of opposed arms pivoted to said body adjacent one end; similar arms pivotally and slidably mounted adjacent the other end, the free ends of an arm from each end meeting generally centrally of said body in a pivotal connection, and antifriction means mounted on each such pivotal connection.

---

It is an object of this invention to provide means whereby a branch in an underground or otherwise concealed pipe may be accurately located and the distance of such branch from a particular reference point may be measured.

It is further object of this invention to provide means as aforesaid which are adjustable to fit and accommodate various diameters of pipe.

It is a further object of this invention to provide a means as aforesaid in which the branch is located by radial movement of a part of the means and in which such radial movement is limited so as not to interfere with withdrawal of such means after the location has been noted and measured.

It is a further object of this invention to provide means as aforesaid which will be operable, whether the pipe is empty or completely or partialy filled with liquid.

It is further object of this invention to provide means as aforesaid so designed and constructed as to permit easy cleaning of the same.

The above and other objects will be made clear from the following detailed description taken in connection with the annexed drawing, in which:

FIG. 1 is a perspective view of the improved device;
FIG. 2 is a partial section on the line 2—2 of FIG. 1; and
FIG. 3 is a plan view of FIG. 1.

This device will be described with reference to locating branches in sewer lines since probably this is the purpose for which it will be most used. Sewer lines rarely run full and even when running full rarely are under any very great static head. By the same token, sewer lines rarely run completely empty for which reason it is important that a device of the type here described be completely operable even when partly or wholly submerged. It is not intended thereby to exclude from the scope of this invention its use on pipe lines other than sewer lines.

Referring now to FIG. 1, the device is shown as made up of a central body or core 10 which, preferably is square in cross-section, though the precise cross-section or formation is not too important. At each end the body 10 is provided with a plate 12 in which is formed a screw-threaded socket 14 to receive the shank of a threaded shaft 16 having at its free end an eye 18. A lock nut 20 is threaded onto the shaft 16 and insures a fixed position of the eye 18. This is important, as presently will appear.

Adjacent one of its ends the core 10 carries bosses 20 which form pivot points for a series of rods 24. The rods 24 are in pairs, the rods of each pair being 180 degress apart on opposite sides of the core 10. Each of the rods 24 has a forked end 26.

A sleeve 28 is slidably mounted adjacent the opposite end of the core 10. The core 10 at this end has a series of apertures 30 which may be brought into registry with any of a series of similar apertures 32 formed in the sleeve 28 so that the longitudinal position of the sleeve 28 may be adjusted for a purpose presently to be described. With the desired registry of a pair of apertures 30 and 32, the sleeve is secured against axial movement by a bolt 34 passing through the registering apertures and secured by a thumb nut 36.

Secured to the sleeve 28 in pairs with one each on opposite sides of the sleeve 28 are operating tubes 38. These are preferably rectangular in cross-section and have opposed side walls provided with slots (FIG. 2). The slots slidably receive pivot pins 42 with each pin pivotally engaging the forked end 44 of a rod 46. Each of the rods 46 has at its opposite end a similar forked member 48. The ends 48 of the rods 46 intersect the forked ends 26 of the rods 24 and have common pivotal engagement with a pivot pin 50 on each of which is mounted a wheel 52 which preferably engages the pin 50 by an antifriction bearing.

Each tube 48 has an open end 54 and at the opposite end an inwardly extending annular flange 56. Within each tube 38 and adjacent the pivot pin 42 is a sliding disk 58 which is biased toward the adjacent pin 42 by a compression spring 60. Each spring 60 bears, at its opposite end, on the annular flange 56.

It will be clear from a consideration of the parts just discussed that the pring 60 will continually urge the pivot pins 42 inwardly along the core 10 with the result that the rods 24 and 46, meeting at the pivot pins 50, will form a toggle and the pins 50 with the wheel 52 will be biased radially outwardly from the core 10. When the device as a whole is inserted into a pipe of given diameter, the action just described will bring the wheels 52 into contact with the interior surface of the pipe and at substantially equal radial distances from the axis of the pipe. A cable 62 (FIG. 3) may be attached to either end or to both ends of the body 10 by means of the eye-bolts 18. Such a cable preferably is calibrated as to length, at least in feet, and preferably in feet and inches.

The usual sewer pipe will have access points spaced along its length and the distance between access points usually is known. A typical method of using this device is to send a man to the upstream access point where he will insert a "snake," which really is simply a ribbon of spring steel, into the sewer line. This may be thrust downstream until it arrives at the next access point downstream from the first point. Here, the snake is secured to one of the rings 18 and is withdrawn, pulling the device with it upstream of the pipe. The calibrated cable 62 will be attached to the opposite end and payed out as the device moves upstream. The Y locator can also be used with the use of a ¾ calibrated steel tape by entering and retrieving from the same access point, without the need to enter the upstream access point with a "snake." When a Y is encountered, the wheel 52 on the side presenting the Y will tend to enter the Y under the impetus of its spring 60. It is recommended that the length of the slots 40 be limited so that the maximum travel of the pins 42 is limited to about 1¼ inches from the retracted position brought about when the device enters the pipe. Under a good many conditions greater travel than this will result in a wheel 52 entering the branch to an excessive extent, thereby producing difficulty in either withdrawing or further advancing the device beyond the Y.

It is a valuable characteristic of this device that it can travel in either direction and may be retracted by pulling on the cable 62 or drawn further into the pipe by means of the snake. This latter is desirable if there are several Y's which it is desired to locate. In either case, entry of wheel 52 into the Y will increase the resistance to further movement of the device very perceptibly so that when a Y is reached the calibrated cable may be tightened and a reading of the calibration made which, with the predetermined effective dimensions of the device, will indicate quite precisely where the Y is located.

The Y locator has a top and bottom. The botton rod 46A is ¼ inch longer than the other three rods 46. The other three rods 46 are identical in length. The pipes in which this device is used are usually substantially horizontal. It is preferred to have one set of arms lowermost. Usually, the device will be arranged with the arm 46A in that position. This puts the weight of the device on the pair of arms which included the arm 46A. To keep the device approximately centered in the pipe, these lowermost arms require additional spring resistance. This could be done by providing the arm 46A with a stronger spring 60. It is preferred, however, to standardize the springs 60 and make the arm 46A about ¼" longer than the other arms. This provides additional compression in its spring 60 and keeps all arms equally spaced from the core 10.

No doubt, a reading of this specification will suggest to those skilled in the art various structural details and modifications over the structure and details disclosed and discussed herein. It is not intended, therefore, to limit this invention to the precise construction illustrated but only as set forth in the subjoined claims.

What is claimed is:
1. An instrument to locate branches in a concealed, substantially horizontal pipe, said instrument comprising: a central, elongated body; a plurality of arms pivoted to said body adjacent one end, the pivots of said arms being spaced about and aligned circumferentially of said body, said arms being of substantially equal length; similar arms pivotally mounted adjacent the other end, the free ends of an arm from each end meeting generally centrally of said body in a pivotal connection, each of said second-mentioned arms being joined to said body by an individual pivot and each of said pivots being individually slidable on said body.
2. The instrument of claim 1, including a separate spring opposing the sliding of each of the slidable pivots.
3. The device of claim 1, including a sleeve fitting said body and longitudinally adjustable thereon, said slidable pivots being mounted on said sleeve.
4. The device of claim 3, including a separate spring opposing the sliding of each of the slidable pivots.

References Cited

UNITED STATES PATENTS

| | | | |
|---|---|---|---|
| 1,708,354 | 4/1929 | Cabot | 33—178 |
| 1,893,600 | 1/1933 | Shull | 33—125 |
| 2,030,244 | 2/1936 | Cox | 33—178 |
| 2,267,110 | 12/1941 | Kinley et al. | 33—178 |

FOREIGN PATENTS 230,860    2/1911    Germany.

SAMUEL S. MATTHEWS, Primary Examiner